United States Patent [19]

Romi

[11] Patent Number: 4,646,893
[45] Date of Patent: Mar. 3, 1987

[54] HYDRAULIC CLUTCH ACTUATOR

[75] Inventor: Romeu Romi, Sao Paulo, Brazil

[73] Assignee: Industrias Romi S/A, Sao Paulo, Brazil

[21] Appl. No.: 599,565

[22] Filed: Apr. 11, 1984

[30] Foreign Application Priority Data

Apr. 11, 1983 [BR] Brazil .................................. 8301833

[51] Int. Cl.[4] ............................................. F16D 25/08
[52] U.S. Cl. .................... 192/85 CA; 92/116
[58] Field of Search .................. 192/85 CA, 91 A; 92/116

[56] References Cited

U.S. PATENT DOCUMENTS

| 2,541,452 | 2/1951 | Wemp | 192/85 CA X |
| 2,864,480 | 12/1958 | Sink | 192/85 CA X |
| 3,131,796 | 5/1964 | Youngs | 192/85 CA |
| 3,321,055 | 5/1967 | Randol | 192/91 A X |
| 3,412,834 | 11/1968 | Root | 192/85 CA |
| 4,049,100 | 9/1977 | Davis | 192/85 CA X |
| 4,069,904 | 1/1978 | Garrett et al. | 192/85 CA |
| 4,526,258 | 7/1985 | Huber | 192/91 A X |

FOREIGN PATENT DOCUMENTS

| 451611 | 10/1948 | Canada | 192/85 CA |
| 904380 | 2/1954 | Fed. Rep. of Germany | 192/91 A |

Primary Examiner—Rodney H. Bonck
Attorney, Agent, or Firm—Michael J. Striker

[57] ABSTRACT

Hydraulic actuator for the operation of clutch discs, consisting of a housing having a hole therein, a hydraulic cylinder having a centrally oriented hole therethrough, the hydraulic cylinder being mounted at its one end to the hole in the housing, and at its other end defining a ring shaped chamber having a u-shaped cross section, a shaft rotatably mounted in the centrally oriented hole of the hydraulic cylinder for supporting the clutch discs, a ring shaped actuator rotatably and slidably mounted in the chamber of the hydraulic cylinder for engaging the clutch discs, and means for selectively actuating the ring shaped actuator so that the clutch discs can be selectively engaged and disengaged.

12 Claims, 3 Drawing Figures

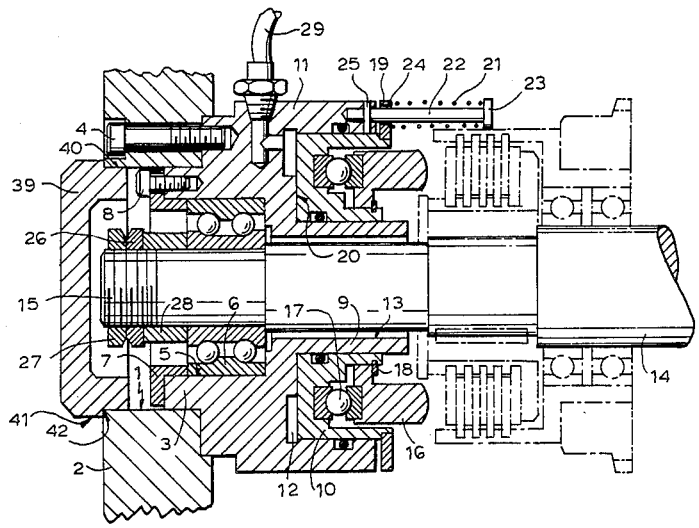

HYDRAULIC CLUTCH ACTUATOR

BACKGROUND OF THE INVENTION

The present invention refers to a hydraulic actuator for the operation of disk clutches.

The types of hydraulic actuators known for this purpose, are of the rotating type, that is, they rotate with the shaft where the clutches are mounted, and the oil supply to the hydraulic cylinder chamber is normally through the shaft interior, therefore requiring the use of a rotating coupling.

The present invention refers to a hydraulic actuator, coaxial to a rotating shaft, destined for the operation of disk clutches on which the plunger of the hydraulic cylinder is rotationally static, that is, without rotating movement and when actuated by oil introduced under pressure in the cylinder chamber, moves said plunger axially for coupling or compressing the disks, comprising said hydraulic cylinder a cylindrical portion in one of its ends with a flanged face at right angle to the geometric axis of the hydraulic cylinder, a cylindrical extension in the other of its ends, on which it is internally guided and hydraulically actuated hydraulic cylinder plunger.

SUMMARY OF THE INVENTION

It is the main object of the present invention to provide a hydraulic actuator intended to actuate clutch disks in which the hydraulic elements are static, that is, they have no rotating movement and as a consequence the oil supply to the hydraulic cylinder chamber is made through non rotating parts, therefore, dispensing with the use of rotating couplings or connections commonly used for this purpose and which known failures are due to internal oil leaking that always occur after slight wear of said parts.

Another object of the present invention is to provide a static hydraulic actuator, coaxial to the rotating shaft, wherein the plunger of the hydraulic cylinder when actuated by the oil entered under pressure into the cylinder chamber moves axially towards coupling or compressing the disks, said plunger also being exempt from rotation, and when oil supply to the cylinder chamber under pressure is interrupted in the cylinder chamber, that is, leaving the oil at free discharge outside the chambers, said plunger returns to its original position through spring action which actuates at the face of a ring that is located in a recess provided at the end of said plunger, said spring being guided on pins which in their turn, they have one of their ends guided and held on holes on the hydraulic cylinder face and, reacting said springs on a head at the other end of said pins, they act on the face of said ring, causing the plunger to return to its original position.

The present invention provides a static hydraulic actuator, coaxial to a rotating shaft, in which the basic part of the assembly consists of a stationary hydraulic cylinder. The hydraulic cylinder has the following configuration: a pilot cylindrical part, at one end used as a guide for its mounting in a hole provided in the box or housing where the hydraulic actuator is to be mounted; a flange as an extension to the mentioned pilot cylindrical part with the face at a right angle to the geometric axis of said hydraulic cylinder, which said face is to be leaned against a recess to be provided on the hole of said box or housing and attached to the box through screws; a cylindrical extension at the other end on which is guided an internal part of the hydraulic cylinder plunger; another cylindrical extension on this same end on the external side of said hydraulic cylinder, which extension serves as a guide for the external part of the nydraulic cylinder plunger; an internal recess shaped by the two said extensions resulting in a chamber which makes up the hydraulic cylinder itself; a through hole with two different diameters, a smaller diameter to allow free passage for the clutch support shaft, and a larger one for the seat of a bearing which supports said shaft.

Alternatively, the hydraulic cylinder may consist of three parts thereby simplifying manufacture and consequently reducing cost. The hydraulic cylinder being a sleeve for support and suspension with the following configuration, a pilot cylindrical part at one end which is used as a guide for mounting in a hole in the housing or boxing where the hydraulic actuator will be mounted; a flange as an extension of said pilot cylindrical part and having a face at a right angle to the geometric axis of said support and suspension sleeve, said face resting against a recess in the hole of said housing or box and the face being the box by screws; another cylindrical part to guide the hydraulic cylinder body, starting from another face of the flange opposite to the face used for resting and fixing on the box, on this other face the hydraulic cylinder body is rested and fixed; a hole with a resting face for mounting an extension bushing over which the internal part of the hydraulic cylinder plunger is guided, the resting and suspension sleeve and the extension bushing make up a hole with two different diameters, a smaller diameter for free passage of the clutch support shaft and a larger diameter for the seat of a bearing that supports said shaft.

The novel features which are considered as characteristics of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
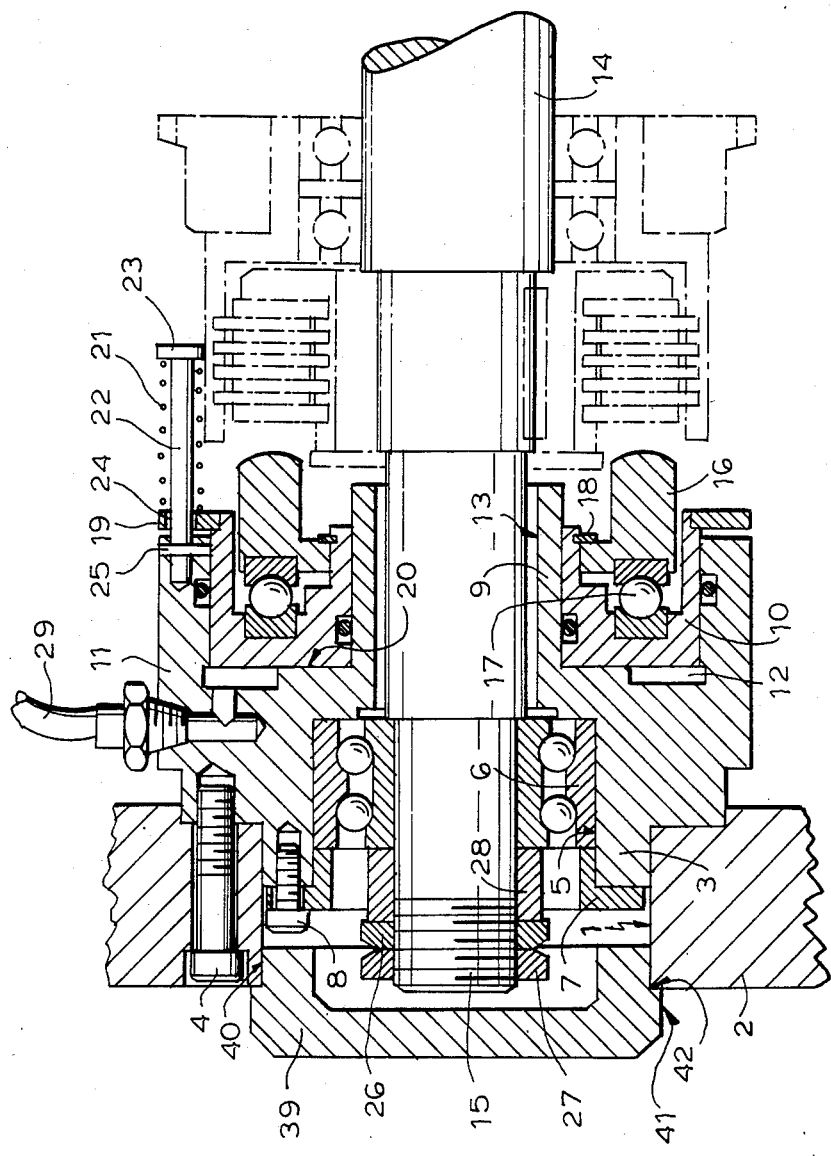
FIG. 1 illustrates a part of a rotation transmission box shown in cross section passing through the center of the shaft where the hydraulic actuator is located and showing the actuator plunger in its non-operating position.

Hole 1 of housing or box 2 as shown in FIG. 1, is guiding hydraulic cylinder 3 which is rigidly fixed on housing 2 by screws 4. A cup shaped cover 39 is mounted on the box 2 and closes the hole 1. The cover has a smaller cylindrical portion 40 which fits into the hole 1, and a larger cylindrical portion which forms a shoulder 41 abutting against an end face 42 of the box 2. The hydraulic cylinder 3 has a hole 5 in one end for seating a bearing 6, which is guided on said hole 5 and blocked by a retaining ring 7, which in turn is fixed on hydraulic cylinder 3 by screws 8. On the other end of the hydraulic cylinder 3 is a cylindrical extension 9 on which it is guided an internal portion of a plunger 10. Also on the other end is a cylindrical extension 11 at the external side of said hydraulic cylinder 3, which extension 11 serves as a guide for an external portion of plunger 10 of hydraulic cylinder 3. An internal chamber 12 is formed by the two extensions 9 and 11, resulting in a ring shaped chamber. The hydraulic cylinder 3 also has a through hole with two different diameters, a smaller diameter 13 for free passage of a clutch support shaft 14, and a larger diameter 5 for seating of a bearing 6 that supports on end 15 of said shaft 14.

Plunger 10 has its internal portion guided and axially sliding along cylindrical extension 9 of hydraulic cylinder 3, and the external portion of plunger 10 is guided and axially sliding along the internal portion of extension 11 of the body of said hydraulic cylinder 3. Said plunger 10 has a ring shape, and is stationary in respect to rotation movements and free to displace itself axially when actuated by oil pressured in chamber 12 of the hydraulic cylinder. Inside plunger 10 is mounted ring 16 that actuates the disk. The actuator ring is rested on a section of an axial bearing 17 so it can rotate freely, and is also retained by a ring 18. When hydraulic cylinder chamber 12 is without oil pressure, a ring 19 is guided on a recessed cylinder located at the end of plunger 10 and joined to the face of this recess, so that said plunger 10 is maintained to lean against a face 20 of hydraulic cylinder 3 by the action of springs 21, which in turn are guided on pins 22 and act on head 23 of said pins, said pins pass with clearance through holes 24 of ring 19, and have ends located in holes existing on the face of extension 11 of the body of hydraulic cylinder 3 and fixed on said extension by lock pins 25.

Rotating shaft 14 where one or more clutches can be mounted, which clutches are not the object of this patent, is supported at one end by a bearing 6, and at the other by a bearing or bushing not illustrated on the figures. Said rotating shaft 14 passes through the actuator by hole 13 provided inside hydraulic cylinder 3. Axial retaining of rotating shaft 14 is made by nut 26 and lock nut 27 that hold said shaft 14 on bearing 6 through distance bushing 28.

Plunger 10 is shown in FIG. 1 in its non-operating position, that is, leaned against face 20 of hydraulic cylinder 3. When the piston takes this position, actuator ring 16 which is retained inside the piston by elastic retaining ring 18, becomes clear from the clutch disks enabling that the clutch is uncoupled. Said plunger 10 takes this position when the oil in hydraulic cylinder chamber 12 is freely discharged through tube 29, and in this case the action of springs 21 on head 23 of pins 22, causes press ring 19 which is guided in a recess at the end of said plunger 10 and leaned against the face of this recess, to force plunger 10 towards face 20 and to lean thereon.

When plunger 10 in the non-operating position, therefore, not coupled to the clutch even if rotating shaft 14 is rotating, the clutch core which is fixed by a key to said rotating shaft 14, does not transmit rotating movement to the external clutch drum.

Figure 2:
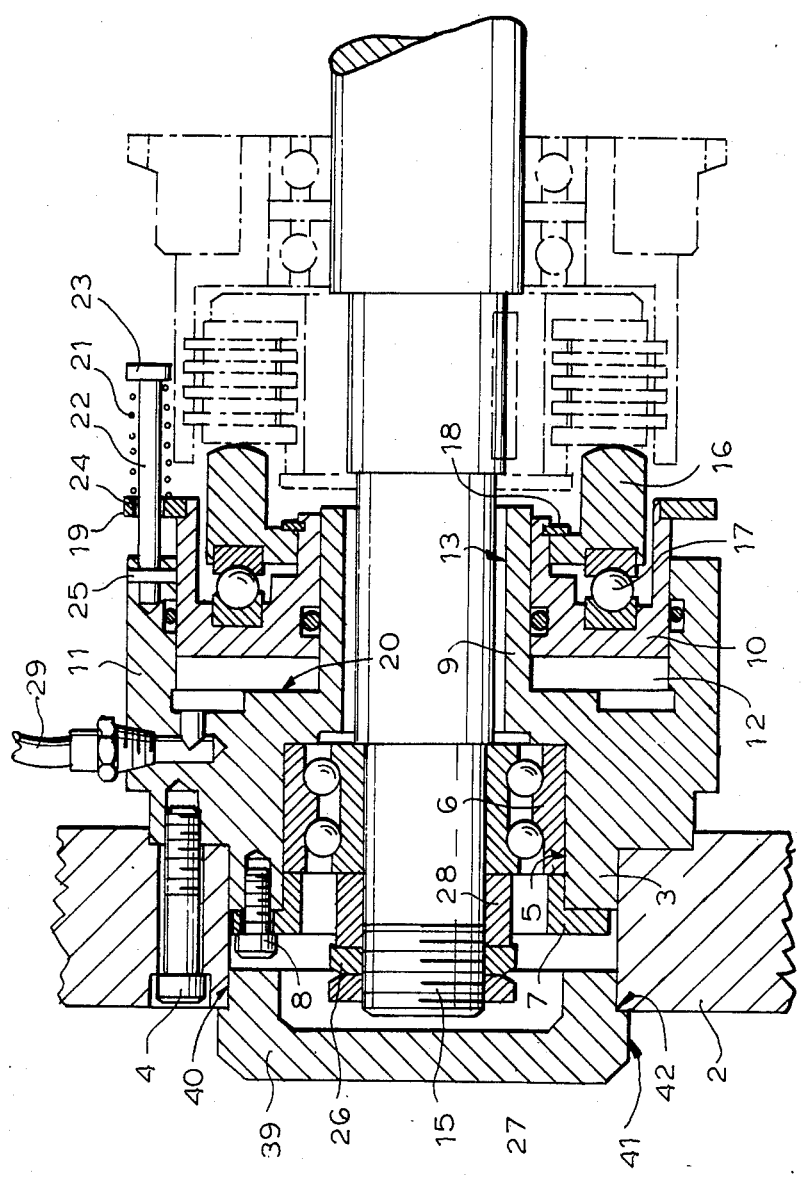
FIG. 2 illustrates the same cross section of FIG. 1, however, showing the hydraulic actuator plunger in its operating position.

In FIG. 2, plunger 10 is shown in its operating position, that is, forcing actuator ring 16 against the clutch disks to keep the clutch coupled. Said plunger 10 takes this position when oil is introduced under pressure in hydraulic cylinder chamber 12 through tube 29, which can be flexible or rigid because it is connected directly to the hydraulic cylinder body which in turn is stationary.

With plunger 10 in this operating position and, therefore, with the clutch coupled, when rotating shaft 14 is rotating, the rotating movement of said shaft is transmitted to the clutch outside drum through friction of internal and external disk faces, caused by the pressure resulting from the effort exerted by actuating ring 16 on them. In this condition the only portion of the hydraulic actuator that rotates together with the clutch and shaft 14 is ring 16. The remaining parts of the hydraulic actuator remain static because ring 19 having holes 24 through which pins 22 pass freely and being joined with hydraulic cylinder 3, prevents plunger 10 from rotating.

Figure 3:
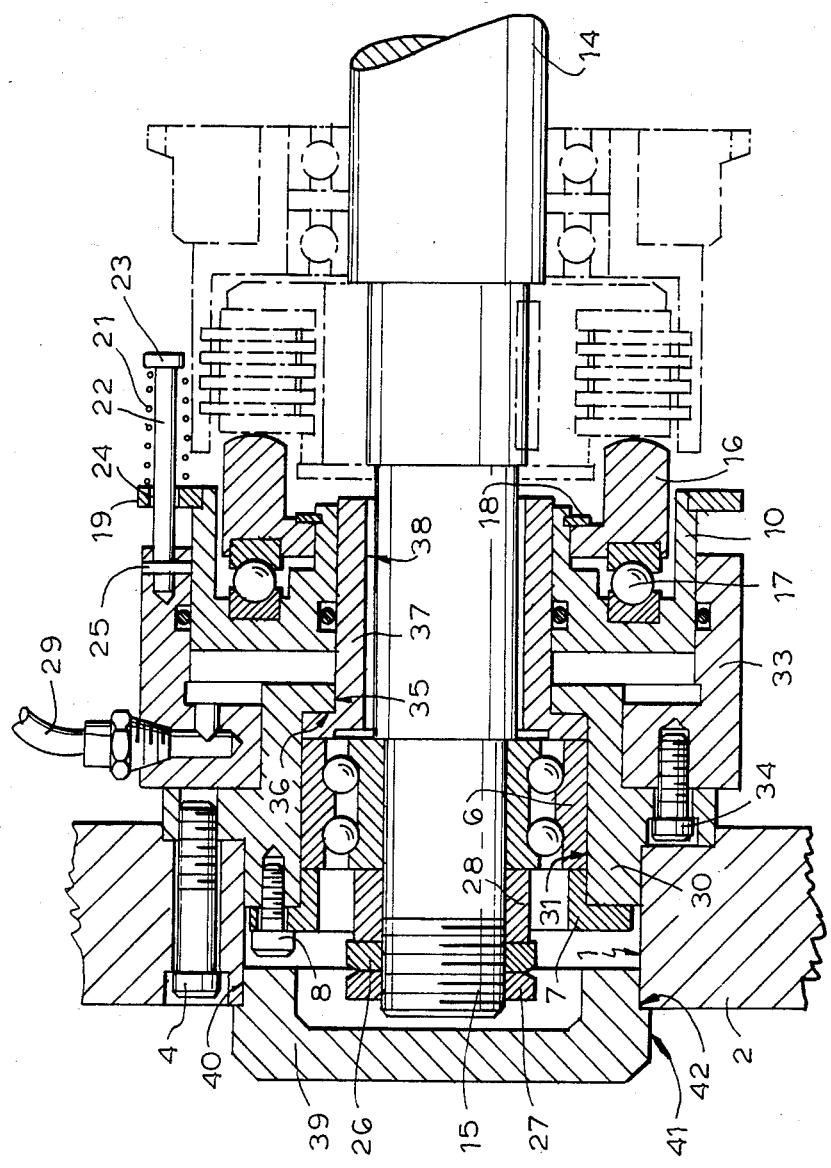
FIG. 3 illustrates the same cross section of FIG. 1, however, showing an alternative construction under which the hydraulic cylinder is shown consisting of three parts.

FIG. 3 as a constructive alternative, shows the hydraulic cylinder divided in three pieces as follows: a resting and suspension bushing 30, which is fixed to the box or housing 2 by screws 4. Said resting and suspension bushing 30 having in one of its ends a hole 31 for lodging bearing 6, which is housed in said hole 31 and blocked by retaining rim 7, which in turn is fixed on said resting and suspension bushing 30 by screws 8. Said resting and suspension bushing 30 also has on its other end a cylindrical extension 32 for guiding a hydraulic cylinder 33 which is fixed on resting and suspension bushing 30 by screws 34. Said resting and suspension bushing 30 also having on the other end a hole 35 and rest 36 for lodging an extension bushing 37 on which the internal section of hydraulic cylinder plunger 10 is guided. Extension bushing 37 also defines a hole 38 which allows free passage of clutch support shaft 14.

While the invention has been illustrated and described as embodied in a hydraulic actuator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Hydraulic actuator for the operation of clutch discs, comprising
   a housing having a throughgoing hole therein;
   a cover mounted in and closing the throughgoing hole in said housing;
   a hydraulic cylinder having a centrally oriented hole there through, said hydraulic cylinder being mounted at its one end in the hole in said housing, and at its other end defining a ring shaped pressure chamber having a U-shaped cross section, said centrally oriented hole in said hydraulic cylinder is formed of two sections having different diameters, a larger diameter section at said one end of said hydraulic cylinder and a smaller diameter section at said other end of said hydraulic cylinder;
   a shaft rotatably mounted in the centrally oriented hole of said hydraulic cylinder for supporting the clutch discs so that one end of said shaft is supported in said larger diameter section while a part of said shaft adjacent the end passes freely through said smaller diameter section of said hole in said hydraulic cylinder;

a ring shaped actuator rotatably and slidably mounted in said chamber of said hydraulic cylinder for engaging the clutch discs;

a one-piece ring shaped plunger having inner and outer diameters and guided with said diameters in said pressure chamber for rotatably supporting said actuator, said plunger having an inner recess in which said actuator is directly mounted;

means for retaining said actuator in said recess of said plunger; and means for selectively actuating said ring shaped actuator so that the clutch discs can be selectively engaged and disengaged with said ring shaped actuator.

2. Hydraulic actuator as defined in claim 1, and further comprising means for rotatably mounting said shaft inside said centrally oriented hole of said hydraulic cylinder.

3. Hydraulic actuator as defined in claim 2, wherein said mounting means includes a bearing mounted in said larger diameter section of said centrally oriented hole and said bearing having a central through going hole for supporting said shaft.

4. Hydraulic actuator as defined in claim 1, and further comprising a bearing oriented between said plunger and said actuator to facilitate rotational movement of said actuator.

5. Hydraulic actuator as defined in claim 1, wherein said retaining means includes a retainer ring for mounting said actuator to said plunger.

6. Hydraulic actuator as defined in claim 5, wherein said retaining means also includes a bearing arranged so that said bearing supports said actuator in said plunger, and said actuator is retained between said bearing and said retainer ring.

7. Hydraulic actuator as defined in claim 1, wherein said actuating means includes a hollow tube connected to a side of said hydraulic cylinder and communicating with said chamber via a series of passages so that oil can enter said chamber and force said plunger and said actuator to move axially so that said actuator engages the clutch discs, and a plurality of springs acting on said plunger so as to cause axial movement away from the clutch discs when the oil in said chamber is removed.

8. Hydraulic actuator as defined in claim 7, and further comprising a radially extending ring connected to said plunger and having a plurality of holes therethrough, a corresponding plurality of guide pins slidably oriented in said ring holes and mounted at one end thereof to said hydraulic cylinder, said pins and said ring thereby acting to prevent rotation of said plunger without interfering with rotation of said actuator.

9. Hydraulic actuator as defined in claim 8, and further comprising locking pins for fixing said guide pins to said hydraulic cylinder.

10. Hydraulic actuator as defined in claim 8, and further comprising a head fixed on each guide pin at its other end, and wherein said springs are helical springs oriented between said pin head and said ring and guided on said guide pins which are projected through the center of said springs.

11. Hydraulic actuator as defined in claim 1, wherein said one of said hydraulic cylinder is formed as a guide part to fit into said hole of said housing, and further comprising a flange for mounting said hydraulic cylinder to said housing.

12. Hydraulic actuator as defined in claim 1, wherein said hydraulic cylinder consists of three parts, the first part being a resting and suspension bushing mounted at its one end to said housing, the second part being a hydraulic cylinder body mounted to the other end of said resting and suspension bushing, and the third part being an extension bushing also mounted to the other end of said resting and suspension bushing, said hydraulic cylinder body and said extension bushing forming said chamber for said plunger.

* * * * *